United States Patent
Collins et al.

(10) Patent No.: US 9,072,093 B2
(45) Date of Patent: Jun. 30, 2015

(54) FLEXIBLE CONTROL CHANNELS FOR UNPLANNED WIRELESS NETWORKS

(75) Inventors: Bruce Collins, San Diego, CA (US);
Gavin Bernard Horn, La Jolla, CA (US); Sanjiv Nanda, Ramona, CA (US);
Ashwin Sampath, Princeton, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 1361 days.

(21) Appl. No.: 11/960,537

(22) Filed: Dec. 19, 2007

(65) Prior Publication Data

US 2009/0161636 A1 Jun. 25, 2009

(51) Int. Cl.
*H04L 12/43* (2006.01)
*H04J 3/00* (2006.01)
*H04W 4/00* (2009.01)
*H04W 72/04* (2009.01)
*H04W 28/08* (2009.01)
*H04W 88/06* (2009.01)

(52) U.S. Cl.
CPC .......... *H04W 72/0446* (2013.01); *H04W 28/08* (2013.01); *H04W 88/06* (2013.01)

(58) Field of Classification Search
USPC .......................................................... 370/458
See application file for complete search history.

(56) References Cited

U.S. PATENT DOCUMENTS

| | | | |
|---|---|---|---|
| 5,625,629 A | 4/1997 | Wenk | |
| 6,567,383 B1* | 5/2003 | Bohnke | 370/280 |
| 6,791,994 B1* | 9/2004 | Young et al. | 370/436 |
| 6,957,042 B2 | 10/2005 | Williams | |
| 7,092,373 B2* | 8/2006 | Parantainen et al. | 370/337 |
| 2001/0001609 A1* | 5/2001 | Mikuni et al. | 370/337 |
| 2004/0032853 A1* | 2/2004 | D'Amico et al. | 370/349 |
| 2004/0109432 A1* | 6/2004 | Laroia et al. | 370/343 |
| 2006/0088007 A1* | 4/2006 | Jalali et al. | 370/334 |
| 2007/0105573 A1 | 5/2007 | Gupta et al. | |
| 2007/0105576 A1 | 5/2007 | Gupta et al. | |
| 2008/0080421 A1* | 4/2008 | Yu et al. | 370/329 |
| 2008/0095074 A1* | 4/2008 | Kwon et al. | 370/255 |
| 2009/0303937 A1 | 12/2009 | Sawahashi et al. | |
| 2010/0111037 A1* | 5/2010 | Tanigawa et al. | 370/331 |

FOREIGN PATENT DOCUMENTS

| | | |
|---|---|---|
| CN | 1324157 A | 11/2001 |
| CN | 1833379 A | 9/2006 |
| EP | 1115217 A2 | 7/2001 |
| JP | 2007221755 A | 8/2007 |
| JP | 2007243898 A | 9/2007 |

OTHER PUBLICATIONS

International Search Report and Written Opinion—PCT/US2008/087090, International Search Authority—European Patent Office—Aug. 5, 2009.
Taiwan Search Report—TW097149941—TIPO—Mar. 19, 2012.
European Search Report—EP08006542—Search Authority—Berlin—Apr. 29, 2009.
3GPP TSG RAN WG1-#51, R1-074769, 6.2.3, "PCFICH Mapping for One Transmitter Antenna", Samsung, Jeju, Korea, Nov. 5-9, 2007, pp. 3.

* cited by examiner

*Primary Examiner* — Shaq Taha
(74) *Attorney, Agent, or Firm* — Joseph S. Hanasz (57) ABSTRACT

A wireless node configured to communicate with a remote node using a timeslot structure. The timeslot structure includes a plurality of data channels and a plurality of control channels, wherein each of the control channels comprises a plurality of control units. The wireless node is further configured to assign any one of a plurality of control messages for the data channels to any one of the control units.

45 Claims, 10 Drawing Sheets

FLEXIBLE CONTROL CHANNELS FOR UNPLANNED WIRELESS NETWORKS

BACKGROUND

1. Field

This disclosure relates generally to wireless communication and more specifically, but not exclusively, to flexible control channels for unplanned wireless networks.

2. Introduction

A wireless communication system may be deployed in various ways depending on the requirements of the intended application. For example, a planned deployment may be utilized for an application such as a cellular network where seamless connectivity is desired over a relatively wide area. To reduce interference in such a network, the channel or channels used by the wireless devices of the network may be defined throughout the network.

Recently, there has been an increasing trend towards low-cost, flexible deployment of wireless networks to support local area networks for indoor cellular usage and home access points. As a result, system design has moved away from the planned and smooth interference model to one that needs to be more robust to (1) bursty interference due to partial loading and (2) service through an access point that may not be the best from an RF link perspective. This leads to greater uncertainty in the design with regard to the lowest signal-to-interference noise ratios (SINRs) that can be achieved as well as the extent of traffic multiplexing that takes place. While data transmissions in such a setting have traditionally been taken care of through dynamic interference avoidance, rate adaptation, and hybrid automatic repeat-request (ARQ) techniques, control transmissions do not enjoy the benefits of those techniques.

Accordingly, there is a need in the art for improvements in control transmissions to enable greater robustness as needed as well as flexibility to traffic demands.

SUMMARY

In one aspect of the disclosure, an apparatus for wireless communications includes a processing system configured to communicate with a remote node using a timeslot structure having a plurality of data channels and a plurality of control channels, wherein each of the control channels comprises a plurality of control units, the processing system being further configured to assign any one of a plurality of control messages for the data channels to any one of the control units.

In another aspect of the disclosure a method of communications includes communicating with a remote node using a timeslot structure having a plurality of data channels and a plurality of control channels, wherein each of the control channels comprises a plurality of control units and each of the control units is capable of carrying any one of a plurality of control messages for the data channels, and assigning one of the control messages to one of the control units.

In yet another aspect of the disclosure, an apparatus for wireless communications includes means for communicating with a remote node using a timeslot structure having a plurality of data channels and a plurality of control channels, wherein each of the control channels comprises a plurality of control units, and means for assigning any one of a plurality of control messages for the data channels to any one of the control units.

In a further aspect of the disclosure, a computer-program product for wireless communications includes a machine-readable medium comprising instructions executable by a processing system to communicate with a remote node using a timeslot structure having a plurality of data channels and a plurality of control channels, wherein each of the control channels comprises a plurality of control units, and assign any one of a plurality of control messages for the data channels to any one of the control units.

In yet a further aspect of the disclosure, an access terminal for wireless communications includes a processing system configured communicate with a remote node using a timeslot structure having a plurality of data channels and a plurality of control channels, wherein each of the control channels comprises a plurality of control units, the processing system being further configured to assign any one of a plurality of control messages for the data channels to any one of the control units, and a user interface configured to enable a user to control communications between the processing system and the remote node.

In another aspect of the disclosure, an access point includes a wireless network adapter configured to support a backhaul for a remote node to a network, and a processing system configured to communicate with the remote node using a timeslot structure having a plurality of data channels and a plurality of control channels, wherein each of the control channels comprises a plurality of control units, the processing system being further configured to assign any one of a plurality of control messages for the data channels to any one of the control units.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Figure 1:
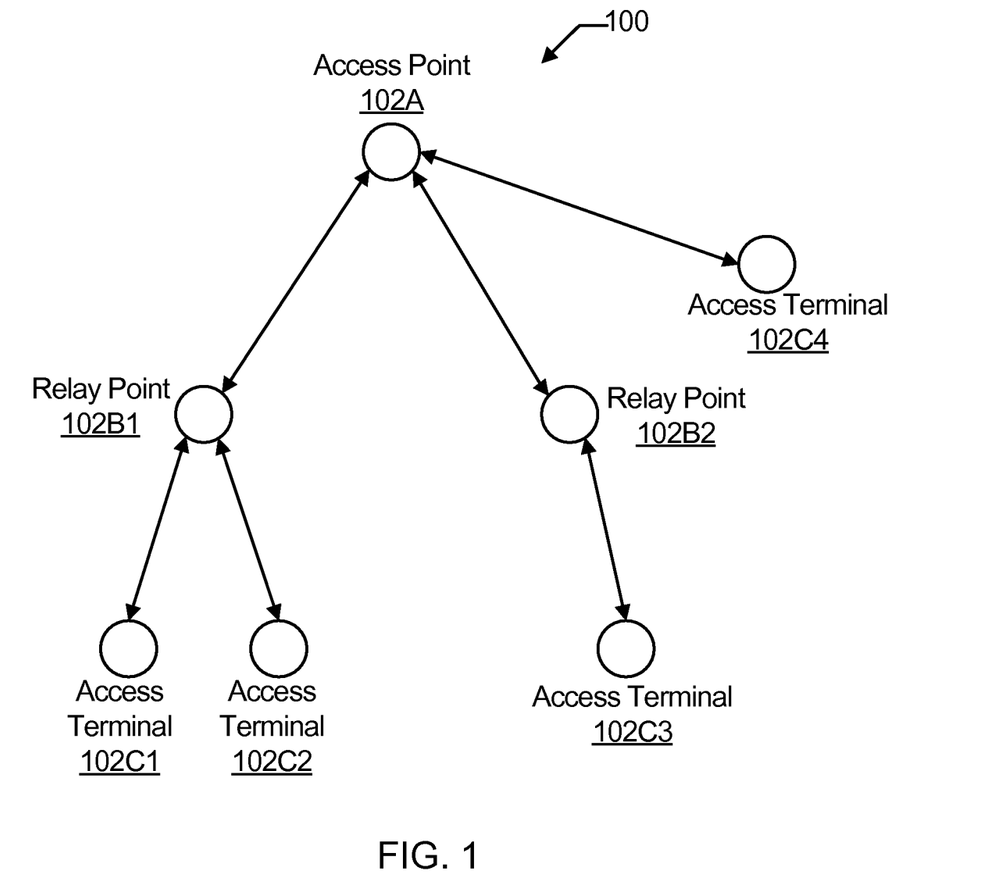
FIG. 1 is a conceptual diagram illustrating an example of a wireless network 100.

FIG. 1 is a conceptual diagram illustrating an example of a wireless network 100. The wireless network 100 is shown with several wireless nodes 102. A wireless node may receive, transmit, or both. In the discussion that follows, the term "receiving node" may be used to refer to a wireless node that is receiving and the term "transmitting node" may be used to refer to a wireless node that is transmitting. These designations do not imply that the wireless node is incapable of performing both transmit and receive functions.

A wireless node may function as an access point, a relay point, an access terminal, or any combination thereof. In the example shown in FIG. 1, a number of the wireless nodes 102A-102B function together to provide backhaul services to a number of access terminals 102C. The network 100 includes a wireless node 102A that functions as an access point by providing an interface to another network (e.g., a cellular network, an Internet service provider (ISP), the Internet, etc.) (not shown). The network 100 also includes two wireless nodes $102B_1$ and $102B_2$ that function as relay points to connect the access terminals 104C to the access point 102A.

The access point 102A may use one of many different wireless access protocols to support radio communications with the relay points 102B and access terminals 102C. By way of example, the access point 102A may support Evolution-Data Optimized (EV-DO), Ultra Mobile Broadband (UMB), 802.11, or any other suitable access protocol. The access point 102A may also support the same or different access protocol with another network (e.g., a cellular network, an Internet service provider (ISP), the Internet, etc.) (not shown). By way of example, the access point 102A may provide an 802.11 interface to the relay points 102B and access terminals 102C and provide an EV-DO interface to the other network. The actual wireless access protocols employed for any particular network will depend on the specific application and the overall design constraints imposed on the system.

Four access terminals 102C are shown in FIG. 1. In this example, two access terminals $102C_1$ and $102C_2$ are connected to the access point 102A through the relay point $102B_1$, one access point $102C_3$ is connected to the access point 102A through the relay point $102B_2$, and one access point $102C_4$ is connected directly to the access point 102A. The connections between the access point 102A and the access terminals 102C may be dynamically reconfigured based on any number of relevant factors (e.g., loading, failures, mobility, etc.). In some configurations of the wireless network 100, an access terminal 102C may be connected to the access point 102A through multiple relay points 102B or support multiple flows (e.g., telephony, messaging, etc.) through one or more relay points 102B. As an example of the latter, a first flow between the access point 102A and the access terminal $102C_2$ may be routed through the relay point $102B_1$ and a second flow between the access point 102A and the access terminal $102C_2$ may be routed through the relay point $102B_2$.

Figure 2:
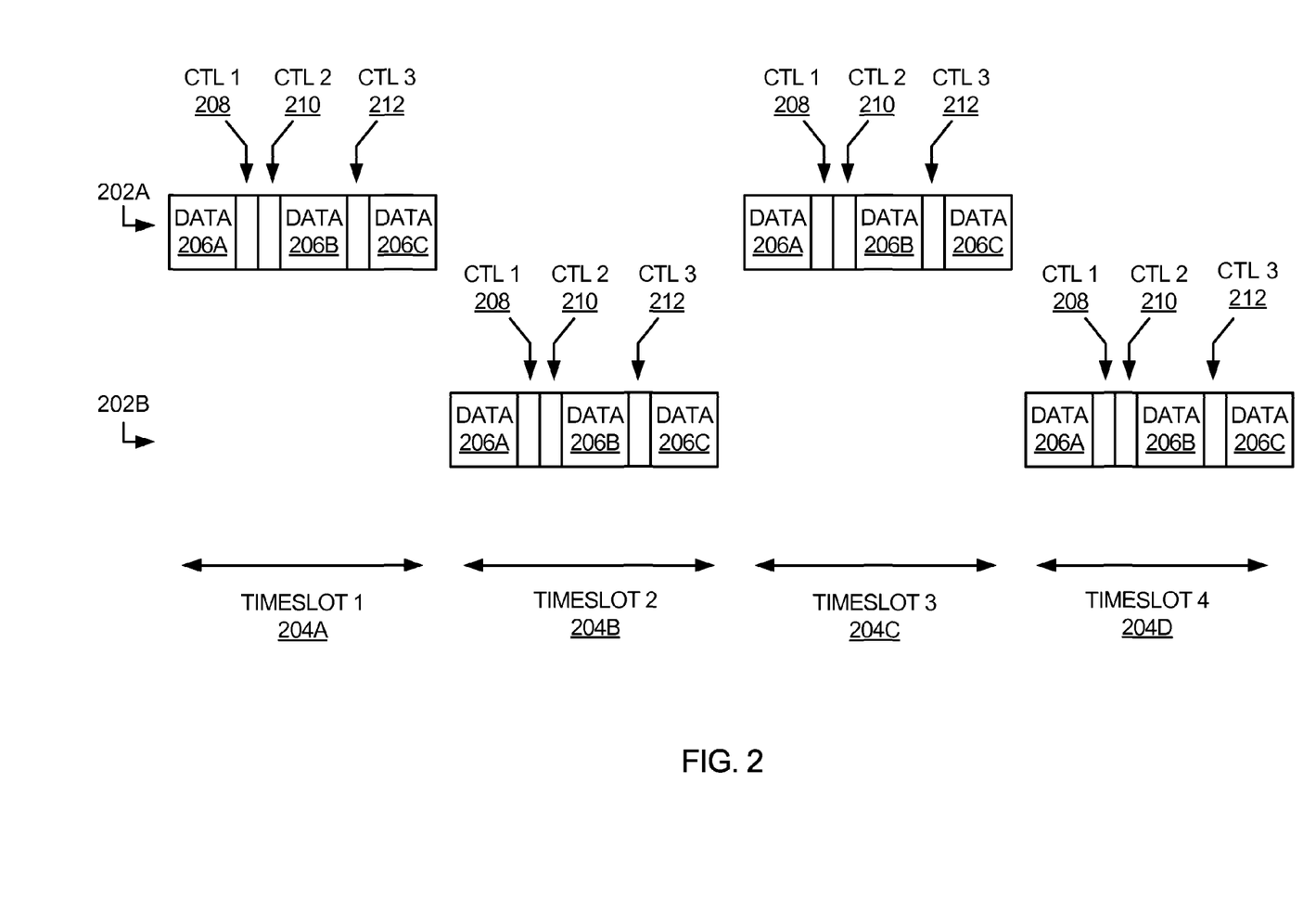
FIG. 2 is a conceptual diagram illustrating an example of a timeslot structure to support communications between two wireless nodes in a wireless network.

In some configurations of the wireless network 100, the flows between wireless nodes may be maintained using a time division multiplexing scheme. By way of example, each wireless node 102 in the network 100 may be assigned designated timeslots to transmit and receive. For instance, the access point 102A may transmit to the access terminal $102C_4$ during odd numbered timeslots and the access terminal $102C_4$ may transmit to the access point 102A during even numbered timeslots. Similarly, the access point 102A may transmit to the relay points $102B_1$ and $102B_2$ during odd numbered timeslots and the relay points $102B_1$ and $102B_2$ may transmit to the access terminals $102C_1$, $102C_2$, and $102C_3$ during even numbered timeslots FIG. 2 is a conceptual diagram illustrating an example of a timeslot structure to support communications between two wireless nodes in a wireless network. In this example, transmissions from a first wireless node to a second wireless node are designated by 202A, and transmissions from the second wireless node to the first wireless node are designated by 202B. More specifically, the timeslot structure 204A shown in timeslot 1 represents a transmission from the first wireless node to the second wireless node, the timeslot structure 204B shown in timeslot 2 represents a transmission from the second wireless node to the first wireless node, the timeslot structure 204C shown in timeslot 3 represents a transmission from the first wireless node to the second wireless node, and the timeslot structure 204D shown in timeslot 4 represents a transmission from the second wireless node to the first wireless node.

Each timeslot includes three data channels 206A-206C and three control channels 208, 210 and 212. The control channels may be used to provide control messages for the information carried in the data channels 206A-206C. In the following example, the control messages will be described in terms of a request/grant scheme to support a transmission from the second wireless node to the first wireless node in timeslot 4.

In timeslot 1, one or more wireless nodes in the network intending to receive data in timeslot 4 transmit a resource utilization message (RUM). By way of example, and with reference to FIGS. 1 and 2, the relay point $102B_1$ may intend to schedule to receive from the access terminal $102C_2$ at the same time the relay point $102B_2$ intends to schedule to receive from the access terminal $102C_3$. Depending on the distance between the relay point $102B_2$ and the access terminal $102C_2$ and the transmission power of the access terminal $102C_2$, a transmission from the access terminal $102C_2$ may interfere with the reception at the relay point $102B_2$. In that event, relay point $102B_2$ may transmit a RUM on one of the control channels 208, 210 and 212 before the scheduled transmissions to indicate to other transmitting nodes that it desires a collision avoidance mode of transmission to mitigate interference. In some configurations, a RUM may be weighted to indicate not only that a receiving node is disadvantaged (e.g., due to the interference it sees while receiving), but also the degree to which the receiving node is disadvantaged. A transmitting node that receives a RUM may utilize the fact that it has received a RUM, as well as the weight thereof, to determine an appropriate response. By way of example, if the access terminal $102C_2$ determines that the relay point $102B_2$ is more disadvantaged than the relay point $102B_1$, access terminal $102C_2$ may elect to abstain from transmitting or may reduce its transmit power to avoid interfering with the relay point $102B_2$. Alternatively, in the event the access terminal $102C_2$ determines that its own relay point $102B_1$ is more disadvantaged than the relay point $102B_2$ (or any other receiving nodes that sent RUMs), the access terminal $102C_2$ may ignore the RUMs from the other nodes. In that case, the access terminal $102C_2$ may elect to transmit.

In the foregoing example, if the access terminal $102C_3$ determines that it may transmit during timeslot 4, it sends a "request" to transmit to the relay point $102B_2$ on one of the control channel 208, 210, and 212 during timeslot 2. In accordance with the RUM-based scheme discussed above, other neighboring transmitting nodes may not send a "request" to transmit during timeslot 2 if their own receiving nodes are less disadvantaged than the relay point $102B_2$.

A "request" may take various forms. By way of example, a "request" may include information regarding the timeslot and data channels which the data is to be transmitted (e.g., timeslot 4 and all data channels 206A-206C), and information regarding the data (e.g., the type of data and quality of service expectations, transmission rate information, transmit power, etc.). In addition, a pilot signal may be transmitted with the request. The pilot signal may be transmitted at a known power spectral density or power level. In this way, upon reception of the request and the pilot signal by the relay point $102B_2$, the appropriate transmission parameters for the data transmission during timeslot 4 may be determined. Such parameters may include, by way of example, data transmission rate, coding, etc.

In response to the "request," the relay point $102B_2$ sends a "grant" to the access terminal $102C_3$ on one of the control channels 208, 210, and 212 during timeslot 3. The "grant" may include the parameters determined by the relay point $102B_2$ (e.g., data transmission rate, coding, etc.) from the "request" and pilot signal.

Upon reception of the "grant," the access terminal $102C_3$ transmits the data on one or more data channels 206A-206C during timeslot 4. The relay point $102B_2$ may acknowledge receipt of the data by sending an "acknowledgement" on the one of the control channel 208, 210 and 212 during timeslot 5 (not shown).

It will be appreciated that the above request-grant scheme may be implemented as a sliding cycle so that data may be transmitted during every transmit timeslot. By way of example, during timeslot 1, the relay point $102B_2$ may transmit a RUM on the first control channel 208 to indicate that it is scheduled to receive a transmission during timeslot 4, an "acknowledgement" on the second control channel 210 to acknowledge a transmission received during the previous timeslot (not shown), a "grant" on the third control channel 212 permitting the access terminal $102CB_3$ to transmit during timeslot 2, and "request" on the third control channel 212 requesting to transmit to the access terminal $102C_3$ during timeslot 3. The relay point $102B_2$ may also transmit data on one or more data channels 206A-206C in timeslot 1 in response to a "grant" received from the access terminal $102C_3$ during the previous timeslot (not shown). The mapping of the control messages to the control channels provided in this example are intended to serve as an illustration only. Various other static and dynamic mapping schemes may be implemented depending on the specific application and the overall design constraints imposed on the system.

Dynamic mapping of control messages to control channels in the timeslot structure may provide certain advantages in a number of situations. An example will now be presented with reference to FIGS. 3 and 4A-4B, where a flexible control channel mapping scheme may be used to support asymmetric data flows.

Figure 3:
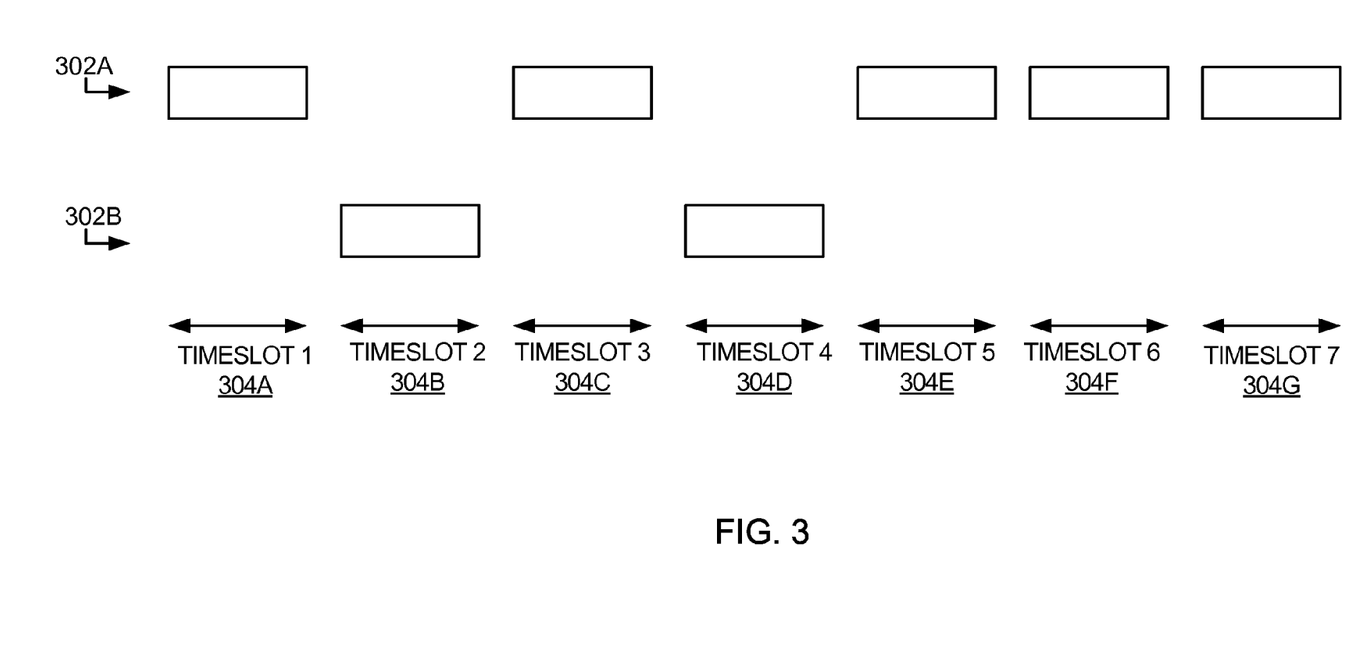
FIG. 3 is a conceptual diagram illustrating an example of a timeslot structure to support asymmetric data flows between two wireless nodes in a wireless network.

FIG. 3 is a conceptual diagram illustrating an example of a timeslot structure to support asymmetric data flows between two wireless nodes in a wireless network. In this example, transmissions from a first wireless node to a second wireless node are designated by 302A, and transmissions from the second wireless node to the first wireless node are designated by 302B. The first wireless node is initially configured to transmit to the second wireless node during odd numbered timeslots 304A, 304C, and the second wireless node is initially configured to transmit to the first wireless node during even numbered timeslots 304B, 304D. For the purposes of illustration only, and without limitation, the following example will be presented with the first wireless node being the relay point $102B_2$ and the second wireless node being the access terminal $102C_3$ of FIG. 1. In addition, various control message assignments will be presented for clarity of explanation with the understanding that the control messages may be mapped to different control channels.

As shown in FIGS. 1 and 3, the time division multiplexing scheme may be dynamically altered to support a change in traffic conditions. By way of example, the relay point $102B_2$ may determine that it has more data to send to the access terminal $102C_3$ than the access terminal $102C_3$ has to send to the relay point $102B_2$. Under these conditions, the relay point $102B_2$ may temporarily designate several of its receive timeslots as transmit timeslots and the access terminal $102C_3$ may temporarily designate several of its transmit timeslots as receive timeslots. This concept is shown in FIGS. 1 and 3 where the relay point $102B_2$ designates timeslot 6 as a transmit slot and the access terminal $102C_3$ designates timeslot 6 as a receive timeslot.

Figure 4A:
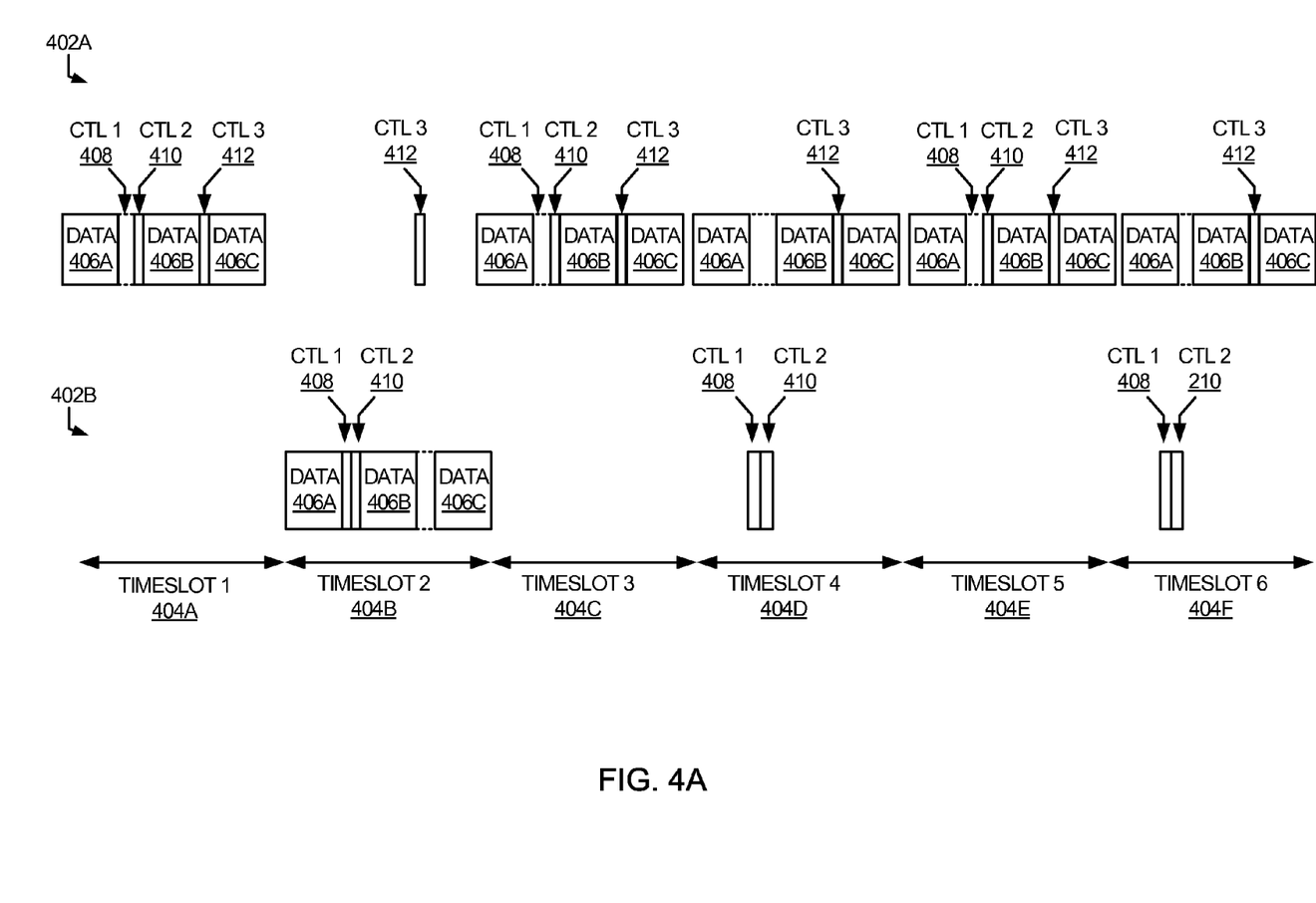
FIG. 4A is a conceptual diagram illustrating a more detailed example of a timeslot structure to support asymmetric data flows between two wireless nodes in a wireless network.

FIG. 4A is a conceptual diagram illustrating a more detailed example of a timeslot structure to support asymmetric data flows between two wireless nodes in a wireless network. In this example, the relay point $102B_2$, which is originally configured to transmit during odd numbered timeslots, decides that it will swap timeslot 4 from a receive timeslot to transmit timeslot. In order to transmit in timeslot 4, the relay point $102B_2$ listens for RUMs on the first control channel 408 of timeslot 1. Here, it should be appreciated that the relay point $102B_2$ is now receiving information during a portion of one of its transmit timeslots. To this end, the timeslots may be defined with guard times before and/or after the control channels to facilitate the relay point $102B_2$ switching from a transmit mode of operation to a receive mode of operation and vice versa.

Depending on the results of an analysis of the RUMs received on the first control channel 408, the relay point $102B_2$ may send a "request" to transmit on third control channel 412 to initiate a swap of one or more timeslots. By way of example, the "request" may include a request to transmit during timeslot 3 (the relay point $102B_2$'s normal transmit timeslot) as well as during timeslot 4 (a timeslot to be swapped). Thus, in this case, the "request" includes an inherent timeslot swap request. In contrast, in other implementations, the relay point $102B_2$ may inform the access terminal $102C_3$ of a timeslot swap by initially sending a dedicated message (e.g., a request to swap).

The relay point $102B_2$ may transmit other control information on the third control channel 412. By way of example, the relay point $102B_2$ may transmit a "grant" in response to a "request" by the access terminal 102C₃ to transmit during timeslot 2. In addition, the relay point 102B₂ may transmit an "acknowledgement" in response to data received from the access terminal 102C₃ during timeslot 0 (not shown).

After receiving the "request" from the relay point 102B₂ during timeslot 1, the access terminal 102C₃ may transmit a "grant" for timeslot 3 or for timeslots 3 and 4 on the second control channel 410 during timeslot 2. That is, the access terminal 102C₃ may issue a collective "grant" for multiple timeslots or may issue grants on a timeslot-by-timeslot basis (e.g., when the "requests" are made on a similar basis). In either case, the "grant" received by the relay point 102B₂ is transmitted on the second control channel 410.

Since the access terminal 102C₃ will not be transmitting data during timeslot 4, it will not need to transmit a "request" and pilot on the third control channel 412 during timeslot 2. Instead, the relay point 102B₂ may transmit a pilot during this period of time on the third control channel 412. Here, it should be appreciated that the access terminal 102C₃ is now receiving during a transmit timeslot (timeslot 2). As discussed earlier, guard times may be provided adjacent the third control channel 412 in the timeslot structure to facilitate the access terminal 102C₃ switching from a transmit mode to a receive mode and vice versa.

The access terminal 102C₃ may also transmit a RUM on the first control channel 408 in preparation for receiving a data transmission from the relay point 102B₂ in timeslot 5.

The relay point 102B₂ may then transmit data on one or more data channels 406A-406B during the requested timeslots (i.e., timeslots 3 and 4).

The relay point 102B₂ and the access terminal 102C₃ may continue to provide appropriate signaling to support the swapping of timeslots for as long as the swapping is needed or allowed. By way of example, the relay point 102B₂ may listen for RUMs associated with contention for timeslot 6 on the first control channel 408 of timeslot 3. The relay point 102B₂ may then send on the third control channel 412 a pilot and a "request" to transmit during timeslots 5 and 6.

The access terminal 102C₃ may use the first and second control channels 408 and 410 during timeslot 4 to acknowledge receipt of the data for timeslot 3, issue a "grant" for timeslots 5 and 6, and transmit a RUM for timeslot 7. Similarly, the access terminal 102C₃ may use the same control channels 408 and 410 during timeslot 6 to acknowledge receipt of the data for timeslots 4 and 5, issue a "grant" for timeslots 7 and 8, and transmit a RUM for timeslot 9.

Figure 4B:
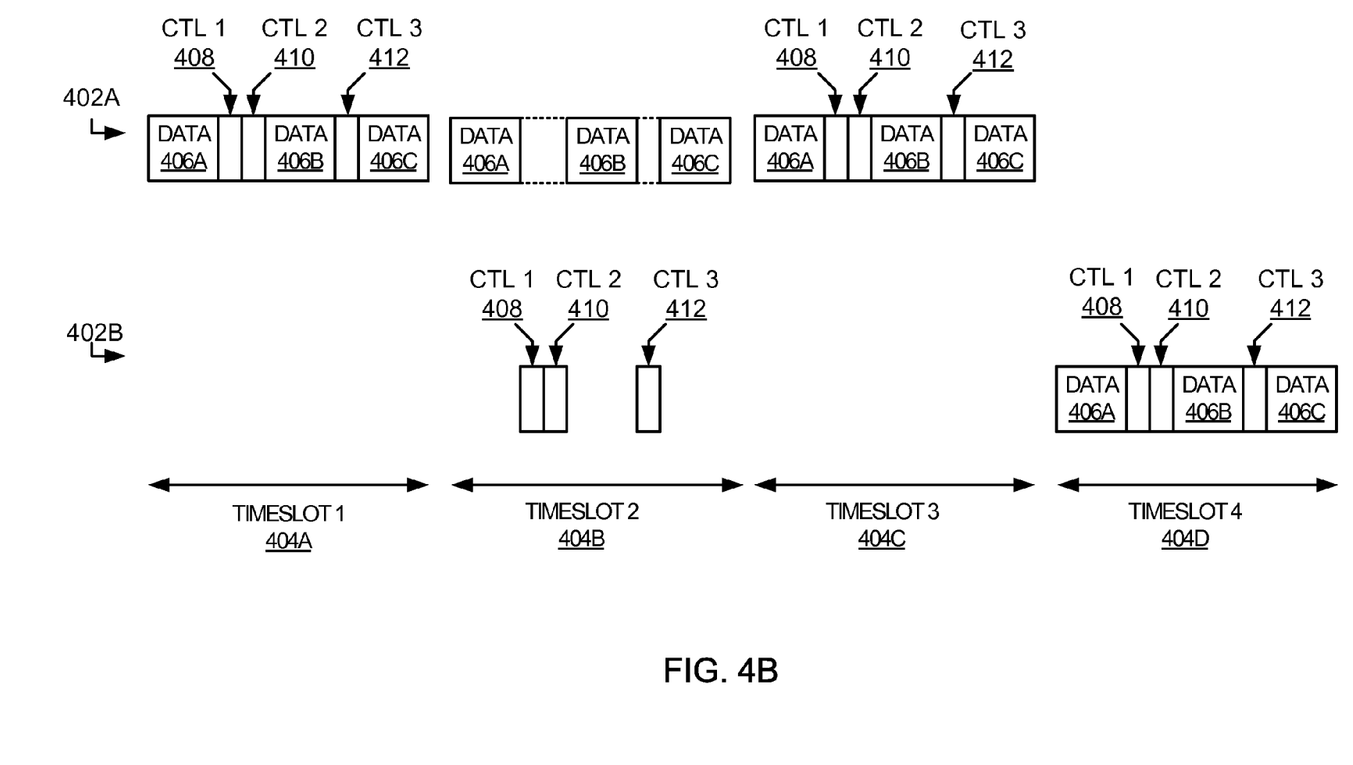
FIG. 4B is a conceptual diagram illustrating an example of a timeslot structure to support a change back to a symmetric data flow between two wireless nodes in a wireless network.

At some point in time, the traffic flow between the relay point 102B₂ and the access terminal 102C₃ may be changed back to a symmetric flow. FIG. 4B is a conceptual diagram illustrating an example of a timeslot structure to support a change back to a symmetric data flow between two wireless nodes in a wireless network. For clarity of presentation, FIG. 4B also refers to timeslots 1-4. It should be appreciated that the use of similar timeslot numbering is not intended to indicate that such timeslots are referring to the same points in time.

As shown in FIG. 4B, the request message transmitted by the relay point 102B₂ on the third control channel 412 during timeslot 1 includes a "request" only to transmit data during timeslot 3. In other words, the "request" does not include a request to transmit data during timeslot 4. The relay point 102B₂ may also send a RUM on the first control channel 408 in anticipation of receiving data in timeslot 4.

The access terminal 102C₃ then transmits on the first and second control channels 408 and 410 during timeslot 2 a "grant" associated with timeslot 3, a RUM associated with timeslot 5, and an "acknowledgement" of the data received during timeslots 0 and 1. In addition, the access terminal 102C₃ transmits on the third control channel 412 during timeslot 2 a "request" and pilot so that the access terminal 102C₃ may transmit data to the relay point 102B₂ during timeslot 4. Operations under the original timeslot designation recommence after the access terminal 102C₃ transmits a "grant," RUM, and "acknowledgement" on the first and second control channels 408 and 410 during timeslot 4.

Figure 5:
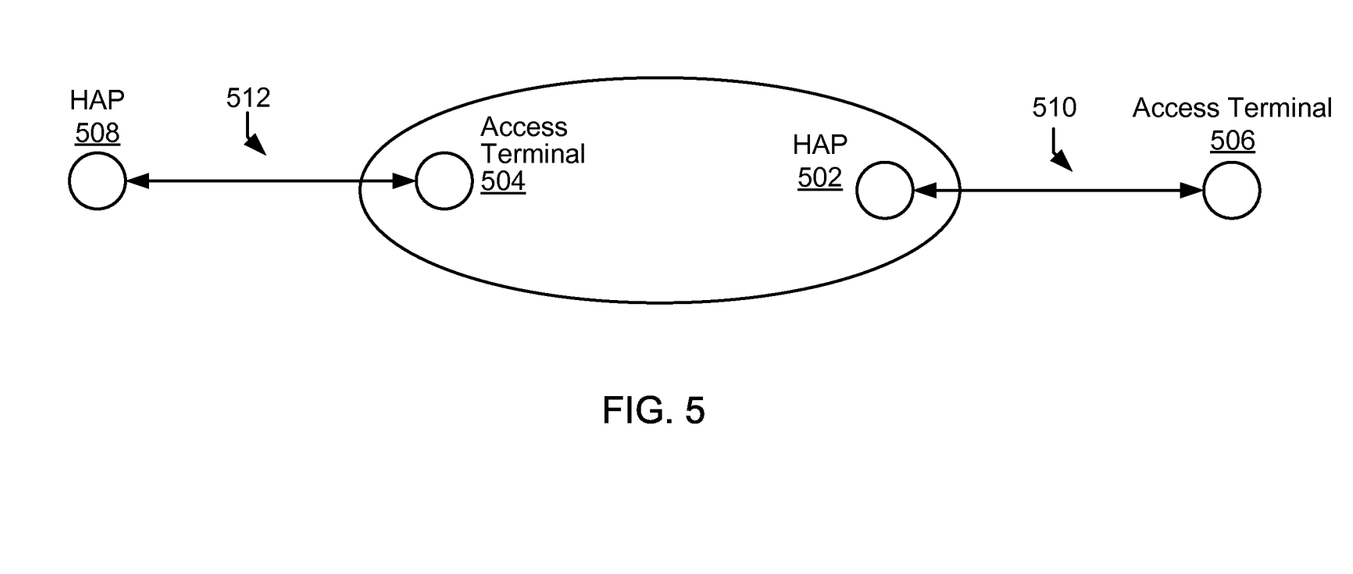
FIG. 5 is a conceptual diagram illustrating an example of a jammer situation that can occur in a home access point (HAP) setting.
Figure 6:
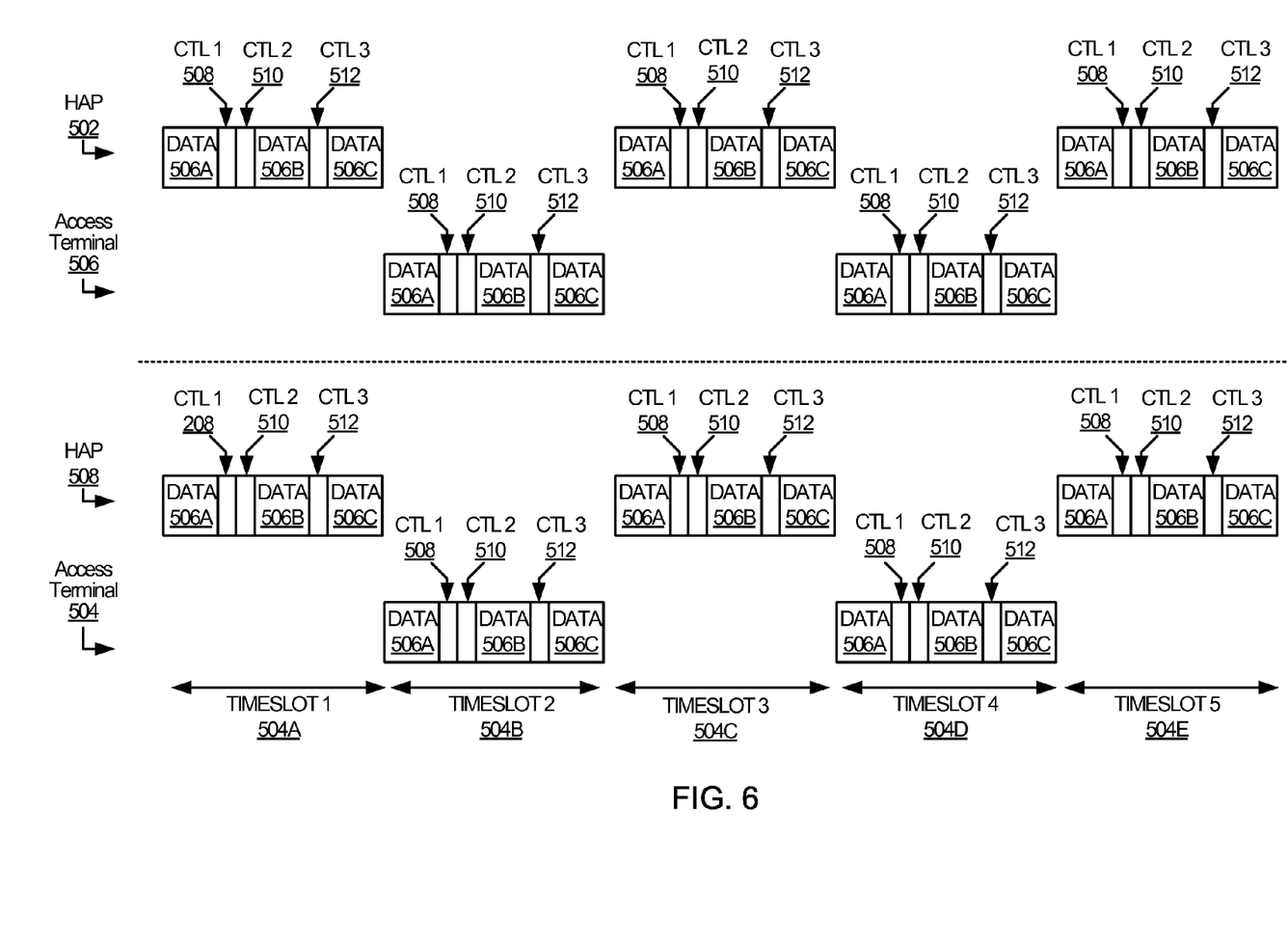
FIG. 6 is a conceptual diagram illustrating an example of a timeslot structure to support jammer avoidance mode of operation.

Another example will now be presented with reference to FIGS. 5 and 6, where a flexible control channel mapping scheme may be used to support jammer avoidance modes of operation. FIG. 5 is a conceptual diagram illustrating an example of a jammer situation that can occur in a home access point (HAP) setting. In this example, an access terminal 504 jams a HAP 502 and vice-versa. More specifically, when the access terminal 504 is transmitting to the HAP 508, the HAP 502 cannot receive from the access terminal 506. Similarly, when the HAP 502 is transmitting to the access terminal 506, the access terminal 504 cannot receive from the HAP 508. In this situation, the two links 510 and 512 can alternate on the channel without losing any timeslots in the transition as shown in FIG. 6.

FIG. 6 is a conceptual diagram illustrating an example of a timeslot structure to support a jammer avoidance mode of operation. In this example, various control message assignments will be presented for clarity of explanation with the understanding that the control messages may be mapped to different control channels. Referring now to FIG. 6, the HAP 502 sends a RUM on the first control channel 508 during timeslot 1 to let the access terminal 504 know that it must back off on control channel usage. The RUM may be a reserved weight setting which requires only energy detection at the access terminal 504. Upon receiving the RUM, the access terminal 504 determines that it must backoff from using the third control channel 512 going forward. In this example, in timeslot 2, the access terminal 504 sends in the second control channel 510 an "acknowledgement" for data received in timeslot 1 and signals to the HAP 508 that it has received a RUM and will not be able to transmit or receive using the third control channel until it no longer hears a RUM, alternatively for some fixed period or a period that is a function of the weight of the RUM. It also serves as a signal to the HAP 508 to use only the second control channel 510 to signal the access terminal 504. In timeslot 3, the HAP 508 knows that it can only use the second control channel 510 to acknowledge data sent by the access terminal 504 in timeslot 2. Correspondingly, the HAP 502, which sent the RUM, only uses the third control channel 512 to avoid jamming the access terminal's 504 reception of control messages on the second control channel 510. A similar procedure may be applied if the access terminal 504 wants to send a RUM to make the HAP 502 backoff to alternate control channel usage.

Many other advantages may be obtained through a flexible control channel mapping scheme. By way of example, there could be some wireless nodes that are very disadvantaged in an unplanned deployment. To enable better reliability on control, the control messages could be sent over two control channels to provide more robustness. For higher data rate transmissions or access terminals with less processing capability, control message assignments can be made with "acknowledgements" sent on the third control channel (as opposed to the second control channel) to provide more decoding time. Those skilled in the art will appreciate other advantages and uses for flexible control channel mapping in unplanned deployment, as well as other types of networks.

To increase flexibility, each control channel may be divided up into sub-channels, or control units. In one example, each control channel comprises an orthogonal frequency division multiplexed (OFDM) symbol which is time division multiplexed within a timeslot. Referring to the timeslot structures described earlier, the first control channel may be a first OFDM symbol, the second control channel may be a second OFDM symbol, and the third control channel may be a third OFDM symbol. Each OFDM symbol may be divided into any number of control units with each control unit comprising any number of tones.

Figure 7:
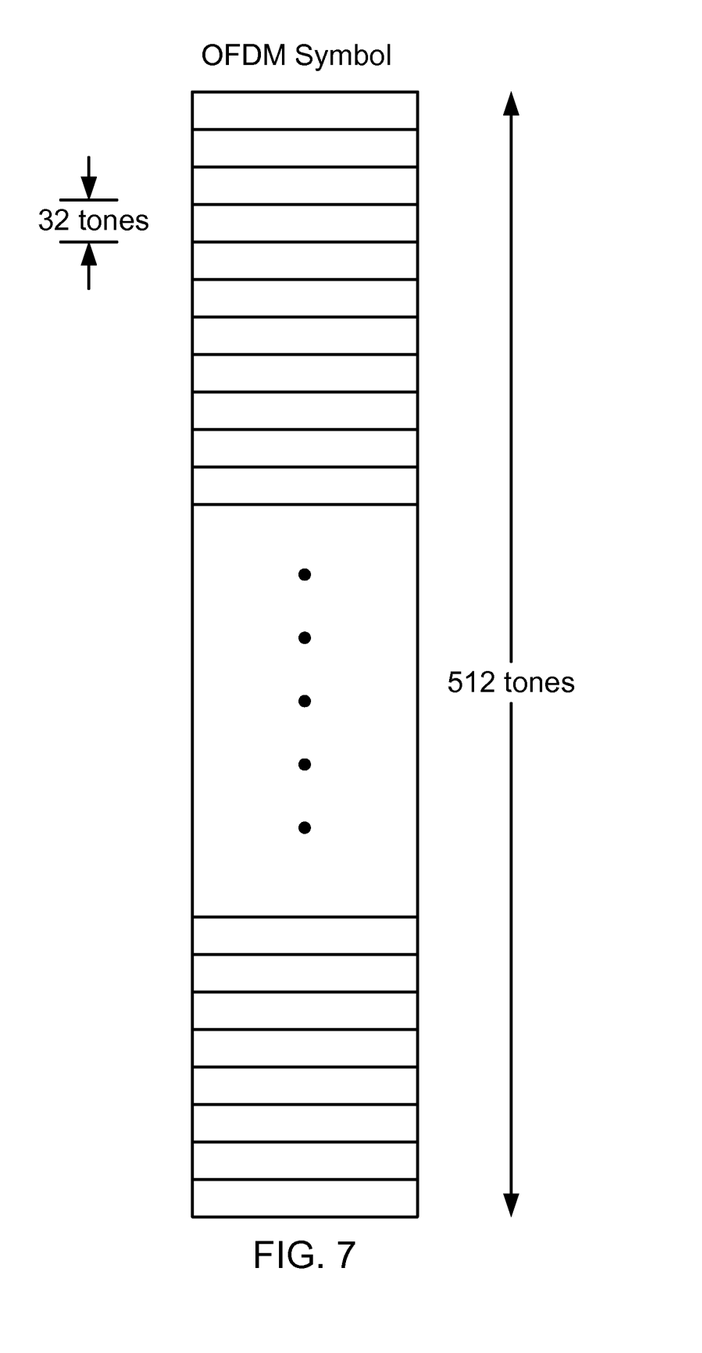
FIG. 7 is a conceptual diagram illustrating an example of a control channel configured as an OFDM symbol.

FIG. 7 is a conceptual diagram illustrating an example of a control channel configured as an OFDM symbol with 512 tones. Each control unit is defined to be 32 tones. Each control unit may be used to send a control message. A field within the control message may be used to determine the type of control message being sent (e.g., request, grant, or acknowledgement). Alternatively, information mapping control message types to control units may be exchanged between the wireless nodes. Several control messages may be carried by a single control unit, with each control message type being assigned to a particular set of tones within the control unit. By way of example, "requests" may be assigned to the first 16 tones of a control unit and "grants" assigned to the second 16 tones in a control unit. Alternatively, or in addition to, a control message may be sent across multiple control units and across multiple control channels. The control units may be of different sizes within a symbol, across symbols, etc. Also, a wireless terminal may transmit on control units of one size and receive on control units of another size.

The alternative mapping schemes described thus far may be optimized to support communications with several other nodes by dedicating one or more control units to exchanging control messages with each of the other nodes. The one or more control units assigned to support communications with any one of the associated nodes may be static, or dynamically altered to support changing traffic conditions. Additional control units may be assigned to support communications with any associated wireless node to provide more robustness at the expense of reducing the number of associated nodes that can be communicated with at any one time.

Although an example of a time division multiplexed control channel comprising an OFDM symbol has been presented, those skilled in the art will appreciate that the control channels may be implemented using other multiple access technologies. These multiple access technologies include, by way of example, time division multiple access (TDMA), frequency division multiple access (FDMA), code division multiple access (CDMA), orthogonal frequency division multiple access (OFDMA), or any other suitable multiple access technology now known or developed in the future. Any suitable combination of these multiple access technologies may be used to implement multiple control channels with each control channel having multiple control units.

Figure 8:
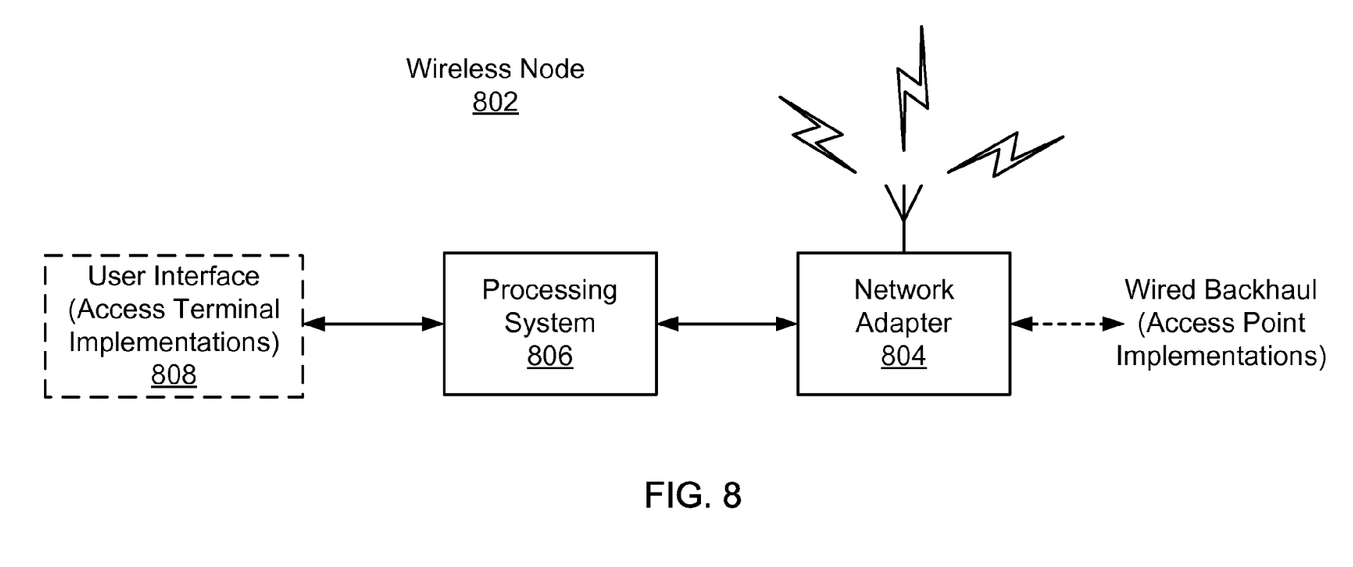
FIG. 8 is a block diagram illustrating an example of the functionality of a wireless node.

FIG. 8 is a block diagram illustrating an example of the functionality of a wireless node. The following descriptive is informative in nature and broadly defines the functionality of each block. Only the pertinent functionality to various concepts described throughout this disclosure will be described. Those skilled in the art will recognize that these functional blocks can provide other functionality that is not described herein. In this example, the wireless node 802 includes two functional blocks: a network adapter 804 and a processing system 806.

The network adapter 804 provides both a transmitter and receiver function. The transmitting function includes modulating a carrier with information. The receiver function includes demodulating a carrier to recover information. The network adapter 804 provides various functions such as RF front-end processing, ADC, timing and frequency estimation, channel estimation, turbo coding etc. In summary, the network adapter 804 provides the complete physical layer implementation of the wireless node 802.

The processing system 806, either alone or in combination with other entities in the wireless node, is configured to implement all functionality above the physical layer. In at least one configuration, the processing system 806 is configured to use the transmitter and receiver functions of the network adapter 804 to support communications with other wireless nodes in the network. The processing system 806 supports a timeslot structure having a number of data and control channels with each control channel having a number of control units. In the transmit mode, the processing system 806 assigns various control messages to the control units and sends data on the data channels. In the receive mode, the processing system 806 receives various control messages carried by the control units and receives data on the data channels. The control messages include, by way of example, a "request" to transmit, a "grant" in response to a request to transmit, an "acknowledgement," and a RUM.

The wireless node 802 may function as an access terminal, access point, relay point, or any combination thereof. A wireless node 802 that functions as an access terminal may include a user interface 808. The user interface 808 may include a display, keypad, speaker, microphone, and/or any other suitable interface that enables a user to operate the access terminal. The user interface 808 is used to control the data that is transmitted and received by the processing system 806 over a wireless uplink connection maintained by the network adapter 804.

A wireless node 802 that functions as an access point includes a network adapter 804 that is capable of maintaining any suitable number of wireless downlink connections with access terminals and/or relay points, as well as maintain one or more uplink connections to support the backhaul. The uplink connection may be wired or wireless. By way of example, the access point may support a wireless downlink connection to a relay point and a wired uplink connection to another network (e.g., the Internet). In this configuration, the processing system 806 utilizes the data and control channels in the timeslot structure to efficiently route data between the upstream and downstream wireless nodes.

The processing system 806 may include one or more processors. A processor may be a general purpose microprocessor, a microcontroller, a Digital Signal Processor (DSP), an Application Specific Integrated Circuit (ASIC), a Field Programmable Gate Array (FPGA), a Programmable Logic Device (PLD), logic circuits, discrete hardware components, or any other suitable entity that can perform calculations or other manipulations of information.

The processing system 804 may also include one or more machine-readable media provide data storage and/or to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal.

Those skilled in the art will recognize how best to implement the described functionality for the processing system.

Figure 9:
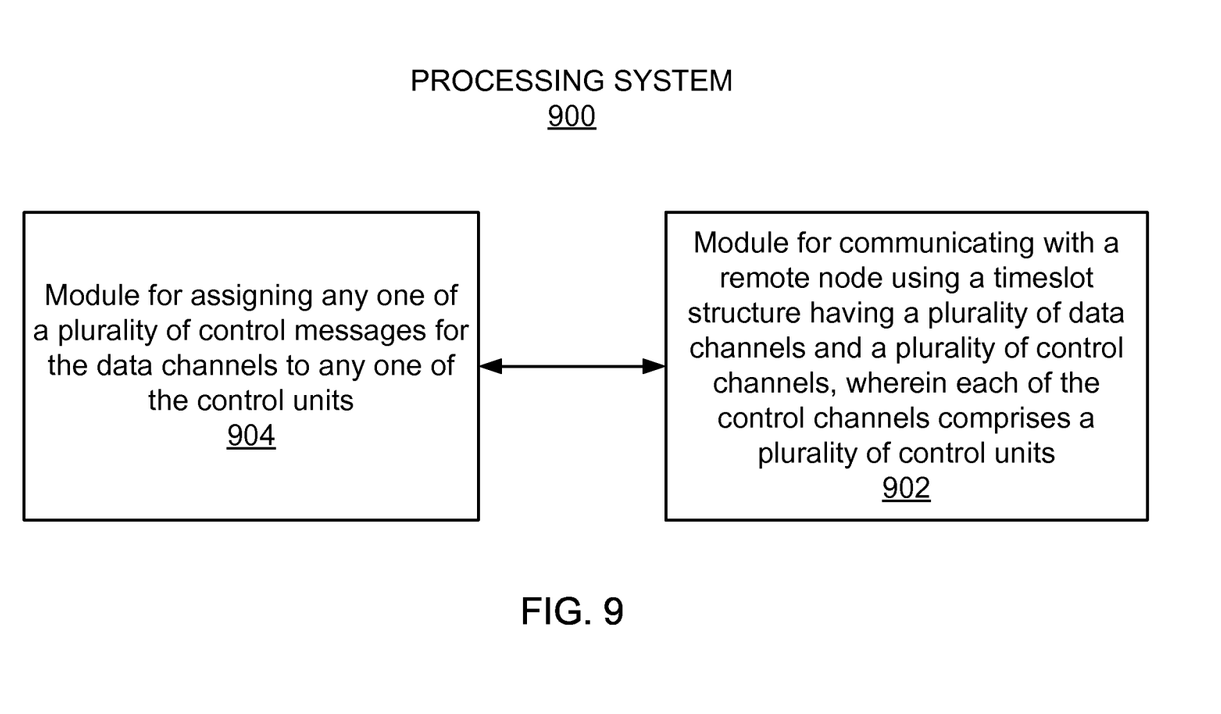
FIG. 9 is a block diagram illustrating an example of the functionality of a processing system.

FIG. 9 is a block diagram illustrating an example of the functionality of a processing system. In this example, the processing system 900 includes a module 902 for communicating with another wireless node using a timeslot structure having a plurality of data channels and a plurality of control channels, wherein each of the control channels comprises a plurality of control units, and a module 904 for assigning any one of a plurality of control messages for the data channels to any one of the control units.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for wireless communications, comprising:
   a processing system configured to communicate with a remote node using a timeslot structure having data channels and control channels, wherein each of the control channels comprises control units, the processing system being further configured to assign one of control messages for the data channels to one of the control units;
   wherein the processing system is further configured to assign the one of the control messages to one of the control channels as a function of a processing capability of the remote node;
   wherein the processing system is further configured to, in one timeslot, receive on a first one of the control channels and transmit on a second one of the control channels.

2. The apparatus of claim 1 wherein each of the control channels comprises an OFDM symbol having a plurality of tones, and wherein each of the control units comprises a portion of the tones for one of the control channels.

3. The apparatus of claim 1 wherein the processing system is further configured to assign a second one of the control messages to a second one of the control units, wherein the second one of the control messages comprises a grant in response to a transmit request from the remote node.

4. The apparatus of claim 1 wherein the processing system is further configured to assign a second one of the control messages to a second one of the control units, wherein the second one of the control messages comprises an acknowledgement that a transmission has been successfully received by the apparatus.

5. An apparatus for wireless communications, comprising:
   a processing system configured to communicate with a remote node using a timeslot structure having data channels and control channels, wherein each of the control channels comprises control units, the processing system being further configured to assign one of control messages for the data channels to one of the control units, and to switch between a first mode comprising transmitting on the data channels in every other timeslot and a second mode comprising transmitting on the data channels in consecutive timeslots;
   wherein the processing system is further configured to assign the one of the control messages to one of the control channels as a function of a processing capability of the remote node;
   wherein the processing system is further configured to, in one timeslot, receive on a first one of the control channels and transmit on a second one of the control channels.

6. The apparatus of claim 5 wherein the processing system is further configured to transmit on the first and second ones of the control channels in at least one of said every other timeslot in the first mode, and wherein the processing system is further configured to, in at least one of said consecutive timeslots, receive on the first one of the control channels and transmit on the second one of the control channels during the second mode.

7. The apparatus of claim 1 wherein a second one of the control messages comprises a request for a collision avoidance mode of transmission.

8. The apparatus of claim 7 wherein the processing system is further configured to transmit said second one of the control messages on one of the control channels, the processing system being further configured to communicate all other control messages with the remote node on one or more different control channels during at least one timeslot following said second one of the control messages.

9. An apparatus for wireless communications, comprising:
   a processing system configured to communicate with a remote node using a timeslot structure having data channels and control channels, wherein each of the control channels comprises control units, the processing system being further configured to assign one of control messages for the data channels to one of the control units;
   wherein a second one of the control messages comprises a request for a collision avoidance mode of transmission and a weight indicating a degree of interference seen by a node transmitting the second one of the control messages, and wherein the processing system is further configured to receive said second one of the control messages on a first one of the control channels, and, in response to receiving said second one of the control messages, to avoid using a second one of the control channels for communicating control messages with the remote node during at least one timeslot following the message.

10. The apparatus of claim 1 wherein the processing system is further configured to transmit one of the control messages on at least two of the control channels in one timeslot.

11. A method of communications, comprising:
    communicating with a remote node using a timeslot structure having data channels and control channels, wherein each of the control channels comprises control units, and each of the control units is capable of carrying one of control messages for the data channels;
    assigning one of the control messages to one of the control units;

assigning the one of the control messages to one of the control channels as a function of a processing capability of the remote node; and in one timeslot, receiving on a first one of the control channels and transmitting on a second one of the control channels.

12. The method of claim 11 wherein each of the control channels comprises an OFDM symbol having a plurality of tones, and wherein each of the control units comprises a portion of the tones for one of the control channels.

13. The method of claim 11 further comprising assigning a second one of the control messages to a second one of the control units, wherein the second one of the control messages comprises a grant in response to a transmit request from the remote node.

14. The method of claim 11 further comprising assigning a second one of the control messages to a second one of the control units, wherein the a second one of the control messages comprises an acknowledgement that a transmission has been successfully received.

15. A method of communications, comprising:
communicating with a remote node using a timeslot structure having data channels and control channels, wherein each of the control channels comprises control units, and each of the control units is capable of carrying one of control messages for the data channels;
assigning one of the control messages to one of the control units;
assigning the one of the control messages to one of the control channels as a function of a processing capability of the remote node;
in one timeslot, receiving on a first one of the control channels and transmitting on a second one of the control channels; and
switching between a first mode comprising transmitting on the data channels in every other timeslot and a second mode comprising transmitting on the data channels in consecutive timeslots.

16. The method of claim 15 further comprising transmitting on the first and second ones of the control channels in at least one of said every other timeslot in the first mode, and, in at least one of said consecutive timeslots, receiving on the first one of the control channels and transmitting on the second one of the control channels during the second mode.

17. The method of claim 11 wherein a second one of the control messages comprises a request for a collision avoidance mode of transmission.

18. The method of claim 17 further comprising transmitting the second one of the control messages on the first one of the control channels and communicating all other control messages with the remote node on the second one of the control channels during at least one timeslot following the second one of the control messages.

19. A method of communications, comprising:
communicating with a remote node using a timeslot structure having data channels and control channels, wherein each of the control channels comprises control units, and each of the control units is capable of carrying one of control messages for the data channels;
assigning one of the control messages to one of the control units;
receiving a second one of the control messages on a first one of the control channels, wherein the second one of the control messages comprises a request for a collision avoidance mode of transmission and a weight indicating a degree of interference seen by a node transmitting the second one of the control messages; and in response to receiving said second one of the control messages, avoiding using a second one of the control channels for communicating control messages with the remote node during at least one timeslot following the message.

20. The method of claim 11 further comprising transmitting said one of the control messages on at least two of the control channels in one timeslot.

21. An apparatus for wireless communications, comprising:
means for communicating with a remote node using a timeslot structure having data channels and control channels, wherein each of the control channels comprises control units, and each of the control units is capable of carrying one of control messages for the data channels;
means for assigning one of control messages for the data channels to one of the control units;
means for assigning the one of the control messages to the one of the control channels as a function of a processing capability of the remote node; and
means for, in one timeslot, receiving on a first one of the control channels and transmitting on a second one of the control channels.

22. The apparatus of claim 21 wherein each of the control channels comprises an OFDM symbol having a plurality of tones, and wherein each of the control units comprises a portion of the tones for one of the control channels.

23. The apparatus of claim 21 further comprising means for assigning a second one of the control messages to a second one of the control units, wherein the second one of the control messages comprises a grant in response to a transmit request by the remote node.

24. The apparatus of claim 21 further comprising means for assigning a second one of the control messages to a second one of the control units, wherein the second one of the control messages comprises an acknowledgement that a transmission has been successfully received.

25. An apparatus for wireless communications, comprising:
means for communicating with a remote node using a timeslot structure having data channels and control channels, wherein each of the control channels comprises control units,
means for assigning one of control messages for the data channels to one of the control units;
means for assigning the one of the control messages to one of the control channels as a function of a processing capability of the remote node;
means for, in one timeslot, receiving on a first one of the control channels and transmitting on a second one of the control channels; and
means for switching between a first mode comprising transmitting on the data channels in every other timeslot and a second mode comprising transmitting on the data channels in consecutive timeslots.

26. The apparatus of claim 25 further comprising means for transmitting on the first and second ones of the control channels in at least one of said every other timeslot in the first mode and means for, in at least one of said consecutive timeslots, receiving on the first one of the control channels and transmitting on the second one of the control channels during the second mode.

27. The apparatus of claim 21 wherein a second one of the control messages comprises a request for a collision avoidance mode of transmission.

28. The apparatus of claim 27 further comprising means for transmitting said second one of the control messages on one of the control channels and means for communicating all other control messages with the remote node on one or more different control channels during at least one timeslot following said second one of the control messages.

29. An apparatus for wireless communications, comprising:
means for communicating with a remote node using a timeslot structure having data channels and control channels, wherein each of the control channels comprises control units;
means for assigning one of control messages for the data channels to one of the control units;
means for receiving a second one of the control messages on a first one of the control channels, wherein the second one of the control messages comprises a request for a collision avoidance mode of transmission and a weight indicating a degree of interference seen by a node transmitting the second one of the control messages; and
means for, in response to receiving said second one of the control messages, avoiding using a second one of the control channels for communicating control messages with the remote node during at least one timeslot following the message.

30. The apparatus of claim 21 further comprising means for transmitting one of the control messages on at least two of the control channels in one timeslot.

31. A computer-program product for wireless communications comprising:
a non-transitory machine-readable storage medium encoded with instructions executable by a processing system to:
communicate with a remote node using a timeslot structure having data channels and control channels, wherein each of the control channels comprises control units, and each of the control units is capable of carrying one of control messages for the data channels;
assign one of control messages for the data channels to one of the control units;
assign the one of the control messages to one of the control channels as a function of a processing capability of the remote node; and
in one timeslot, receive on a first one of the control channels and transmit on a second one of the control channels.

32. An access terminal for wireless communications, comprising:
a processing system configured to communicate with a remote node using a timeslot structure having data channels and control channels, wherein each of the control channels comprises control units, the processing system being further configured to assign one of control messages for the data channels to one of the control units; and
a user interface configured to enable a user to control communications between the processing system and the remote node;
wherein the processing system is further configured to assign the one of the control messages to one of the control channels as a function of a processing capability of the remote node;
wherein the processing system is further configured to, in one timeslot, receive on a first one of the control channels and transmit on a second one of the control channels.

33. An access point, comprising:
a wireless network adapter configured to support a backhaul for a remote node to a network; and
a processing system configured to communicate with a remote node using a timeslot structure having data channels and control channels, wherein each of the control channels comprises control units, the processing system being further configured to assign one of control messages for the data channels to one of the control units;
wherein the processing system is further configured to assign the one of the control messages to one of the control channels as a function of a processing capability of the remote node;
wherein the processing system is further configured to, in one timeslot, receive on a first one of the control channels and transmit on a second one of the control channels.

34. The apparatus of claim 1, wherein the one of the control messages further comprises information identifying a timeslot and one or more data channels on which data is to be transmitted by the apparatus.

35. The apparatus of claim 1, wherein the one of the control messages further comprises a pilot signal.

36. The apparatus of claim 3, wherein the second one of the control messages further comprises a data rate for data to be transmitted to the apparatus.

37. The apparatus of claim 5, wherein the first mode comprises receiving on the data channels in alternating timeslots.

38. The apparatus of claim 1, wherein said one of the control messages comprises an acknowledgement and the processing system is further configured to assign said one of the control messages to the first one of the control channels or to the second one of the control channels based on the processing capability of the remote node.

39. The apparatus of claim 1, wherein a second one of the control messages comprises a grant to transmit and a third one of the control messages comprises a pilot signal, and the processing system is further configured to receive the second one of the control messages on the first one of the control channels and to transmit the third one of the control messages on the second one of the control channels.

40. The apparatus of claim 5, wherein a second one of the control messages comprises a request to transmit during a timeslot initially allocated to the remote node for transmission by the remote node and a third one of the control messages comprises a grant to transmit, and the processing system is further configured to transmit the second one of the control message on the first one of the control channels and to switch from the first mode to the second mode upon receiving the third one of the control messages on the second one of the control channels.

41. The apparatus of claim 40, wherein the second one of the control messages is transmitted in a first timeslot and the third one of the control messages is received in a second timeslot immediately following the first timeslot.

42. The apparatus of claim 5, wherein the processing system is further configured to determine whether the apparatus has more data to transmit to the remote node than the remote node has to transmit to the apparatus, and to switch from the first mode to the second mode upon determining that the apparatus has more data to transmit to the remote node.

43. The apparatus of claim 1, wherein the one of the control messages comprises a request by the apparatus to transmit during a timeslot initially allocated to the remote node for transmission by the remote node, wherein the request by the apparatus to transmit during the timeslot comprises a request by the apparatus to transmit data on one or more of the data channels during the timeslot initially allocated to the remote node.

44. The apparatus of claim 43, wherein the timeslot is initially allocated for data transmission by the remote node to the apparatus.

45. The apparatus of claim 5, wherein the first mode comprises transmitting data to the remote node and receiving data from the remote node in alternating time slots, and the second mode comprises transmitting data to the remote node in consecutive timeslots.

* * * * *